Oct. 13, 1936.  R. O. BATE  2,056,997
WEIGHING DEVICE
Filed March 30, 1936  2 Sheets-Sheet 1
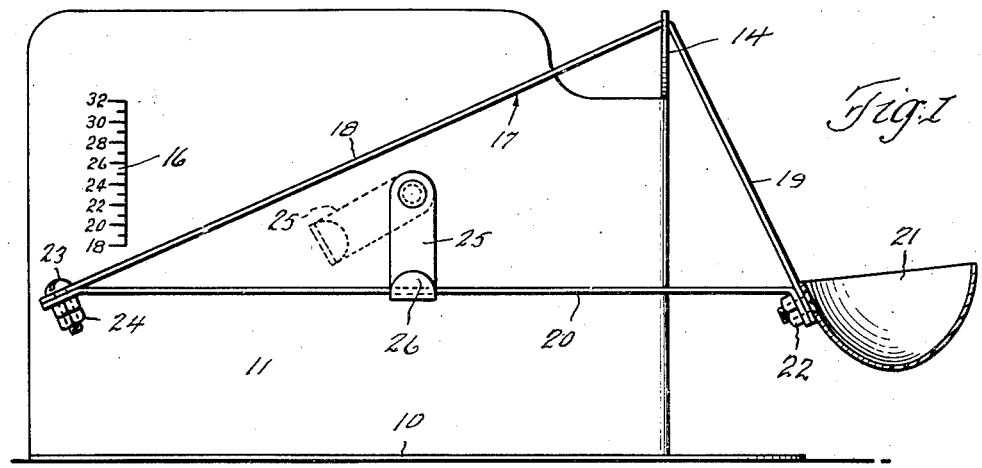
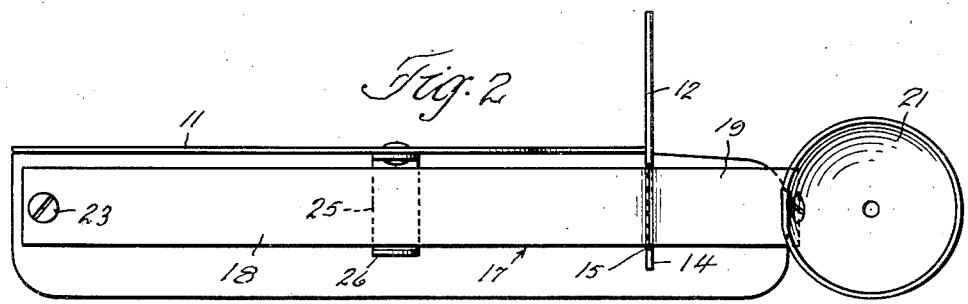
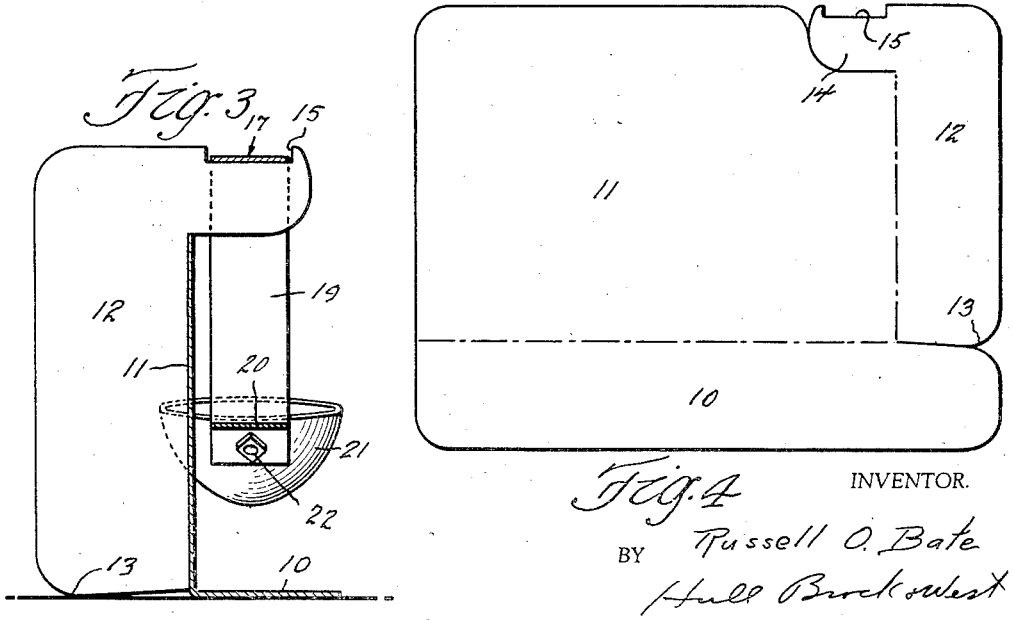
INVENTOR.
Russell O. Bate
BY
Hull Brock West
ATTORNEY.

Oct. 13, 1936.     R. O. BATE     2,056,997
WEIGHING DEVICE
Filed March 30, 1936     2 Sheets-Sheet 2
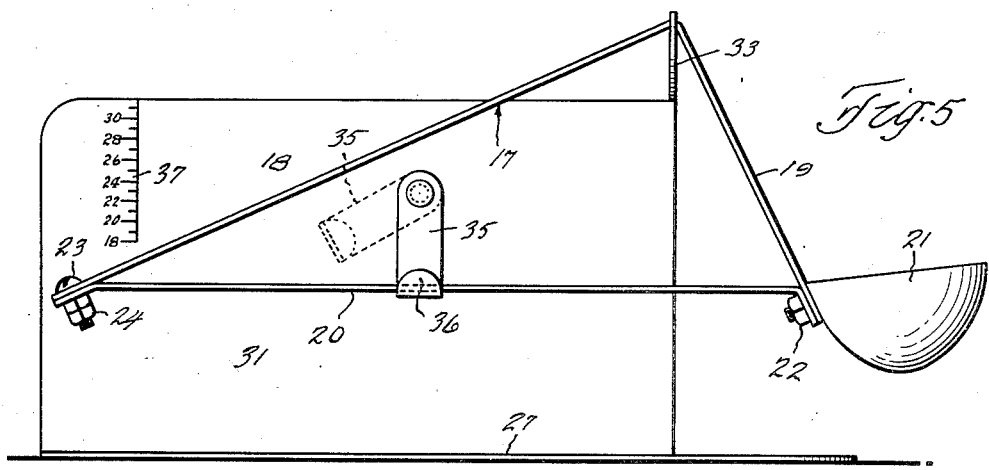
Fig. 5
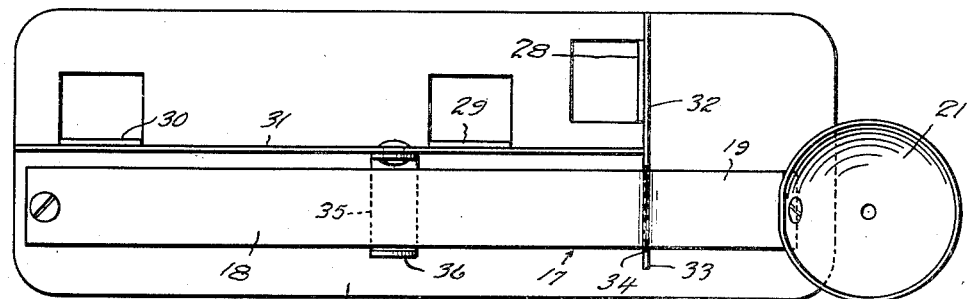
Fig. 6
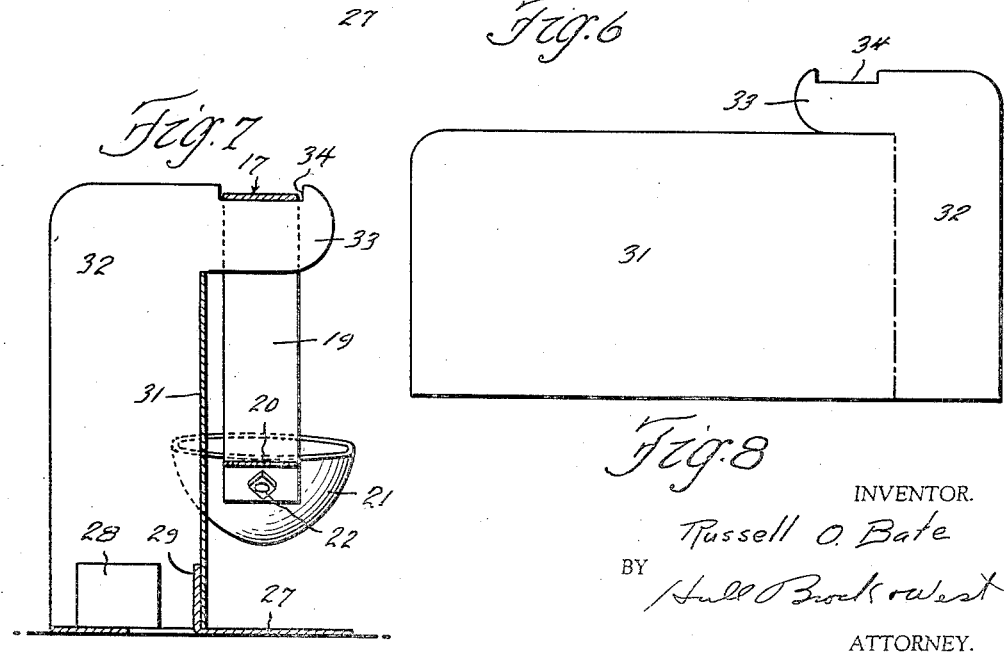
Fig. 7
Fig. 8
INVENTOR.
Russell O. Bate
BY Hull Brock & West
ATTORNEY.

Patented Oct. 13, 1936

2,056,997

UNITED STATES PATENT OFFICE 2,056,997

WEIGHING DEVICE

Russell O. Bate, Macedonia, Ohio

Application March 30, 1936, Serial No. 71,599

11 Claims. (Cl. 265—61)

This invention relates to a weighing device adapted for weighing small articles. While this device has been designed with special reference to grading eggs according to weight, it is to be understood that the following description with reference to its use for that purpose is illustrative only. The principal object of the invention is to provide a device which is of extreme simplicity and capable of being manufactured at a low cost, at the same time being accurate and very convenient in use.

Other objects will be in part apparent and in part pointed out hereinafter in connection with the accompanying drawings wherein Fig. 1 is a front elevation of the present preferred embodiment of the invention; Fig. 2 is a plan view thereof; Fig. 3 is a sectional view taken along the left surface of the fulcrum as seen in Fig. 1 and looking toward the right; Fig. 4 is a development of the blank of which the upright elements are formed; Fig. 5 is a front elevation of a modified form of the invention; Fig. 6 is a plan view thereof; Fig. 7 is a section taken along the left surface of the fulcrum element looking to the right in Fig. 5; and Fig. 8 is a development of the blank from which the vertical and fulcrum-bearing plates are formed.

Referring now to Figs. 1 to 4 inclusive, it will be seen that the device comprises a sheet metal base 10 from which a vertical plate 11 extends upwardly at right angles. Integral with the plate 11 is a fulcrum carrying element 12 which is shaped so that the lower portion extends below the upper surface of the plate 10 a distance about equal to the thickness thereof as best seen in Figs. 3 and 4. The plates 10, 11, and 12 preferably are positioned so that each is at right angles to both of the others. The plate 12 carries a fulcrum element 14 which is provided with a beam receiving notch 15. The plate 11 is provided with indicia as shown at 16 adjacent the path of movement of the beam 17. The beam 17 consists of a strap metal triangle made up of upper and lower parts. The upper part is in the form of an inverted V, having a long portion 18 extending along and parallel with the plate 11 and a shorter portion 19 extending to the right of the plate 12, the apex being supported by the fulcrum 14 and held in position by the notch 15.

Connecting the lower ends of the portions 18 and 19 is a strap 20. At one end the strap 20 is secured to the portion 19 and an egg cup 21 or other article supporting element by any suitable means, as, for example, a bolt 22. It will be noted that by positioning the element 12 at the end of plate 11, the cup 21 may project at both sides of the plate 11 and not be interfered with by any of the supporting parts. The portion 18 and the left hand end of the strap 20 are connected by a bolt 23 upon which may be received a plurality of nuts 24 which serve as a weight. The nuts 24 may be of any desired number and/or size.

Attached to the plate 11 is an adjustable stop element 25, which is secured thereto as by rivet 26 so as to be capable of rotation as indicated in Fig. 1 and being sufficiently tightly riveted to the plate 11 to offer considerable frictional resistance to rotation. The lower end of the element 25 is provided with hook 26 adapted to receive the strap 20.

In operation, the egg or other article to be weighed is placed in the egg cup or other article supporting means 21 and the beam allowed to come to rest. The indicia 16 will take the form of a suitably calibrated scale so as to weigh in any desired units. In the case of eggs, it is desirable that the units be ounces per dozen, although it is to be understood that any suitable unit may be selected. Where it is desired merely to ascertain that the articles being weighed are in excess of a predetermined desirable weight, the stop 25 may be set to a position so as to limit the motion of the beam in either direction at a predetermined point. It is then only necessary to place the article in the cup 21 and note whether the beam is lifted from or locked against the support 25. This obviates the necessity for waiting for the beam to come to rest.

In Figs. 5 to 8, I have shown a modified form of invention wherein the base 27 is made from one sheet of metal with struck up portions 28, 29 and 30 and the upright indicia bearing plate 31 and fulcrum bearing plate 32 are formed of another piece of metal and attached to the portions 28, 29, and 30 by spot welding or in any other suitable manner. The indicia bearing plate 31 and fulcrum bearing plate 32 bear the same relation to each other as to the corresponding plates in the first described form and the fulcrum portion 33 and notch 34 are of the same construction as in the first form. A stop 35 of the same construction as the stop 25 is secured to the plate 31 in the same manner as the stop 25 is secured to the plate 11 and is provided with a hook 36 of the same construction as that 26. The plate 31 is provided with indicia 37 taking the form of a suitably calibrated scale as in the previous case.

The swinging portion of the device is of identical construction with that in the previous form and has been given the same numerals. The two forms are operated in the same way.

While I have shown and described the present preferred embodiments of my invention, I wish it to be understood that the same may be realized in different forms and that I am limited only in accordance with the appended claims and the prior art.

Having thus described by invention, what I claim is:

1. A weighing device comprising, in combination, an upstanding plate having indicia thereon, a fulcrum projecting transversely from said upstanding plate, a beam supported by said fulcrum intermediate its ends and having on one end thereof means for receiving an article to be weighed, the other end adapted to move adjacent said indicia, said fulcrum being above the ends of said beam.

2. A weighing device comprising, in combination, a base, a plate upstanding therefrom and having indicia thereon, a fulcrum integral with and projecting laterally from said upstanding plate, a beam mounted on said fulcrum for motion parallel to said plate and having its ends positioned therebelow, means for supporting an article to be weighed on said beam at one side of said fulcrum and a weight carried by said beam at the other side of said fulcrum.

3. A weighing device comprising, in combination, a sheet metal base, a sheet metal plate fixed with respect thereto and extending upwardly therefrom, a fulcrum comprising a struck-out portion of said upstanding plate, and a beam swingably mounted on said fulcrum and including an inverted V-shaped element supported at its apex on said fulcrum and carrying therebelow and on opposite sides thereof an article receiving element and a weight, said plate being provided with indicia adjacent the path of one portion of said inverted V-shaped element.

4. A weighing device comprising, in combination, a sheet metal base, a sheet metal plate fixed with respect thereto and extending upwardly therefrom, a fulcrum comprising a struck-out portion of said upstanding plate, and a beam swingably mounted on said fulcrum and including an inverted V-shaped element supported at its apex on said fulcrum and carrying therebelow and on opposite sides thereof an article receiving element and a weight, said plate being provided with indicia adjacent the path of one portion of said inverted V-shaped element, and adjustable means for limiting the swinging motion of said beam in one direction.

5. A weighing device comprising, in combination, a base, a plate upstanding therefrom, a fulcrum projecting to one side of said plate adjacent one end thereof, a beam supported by said fulcrum and carrying therebelow and at the two sides thereof article receiving means and a weight, said plate being provided with indicia adjacent the path of one portion of said beam.

6. A weighing device comprising, in combination, a base, a plate upstanding therefrom, a fulcrum projecting to one side of said plate adjacent one end thereof, a beam supported by said fulcrum and carrying therebelow and at the two sides thereof article receiving means and a weight, said plate being provided with indicia adjacent the path of one portion of said beam, and adjustable means carried by said plate for limiting swinging motion of said beam in one direction.

7. In a weighing device, as a sub-combination, a base and a sheet metal support upstanding therefrom, said support comprising two parts bent to substantially right angles to each other, one of said parts adapted to extend parallel with the beam and the other adapted to extend substantially at right angles thereto, said last mentioned part comprising a flat element having its major portion at one side of said first mentioned part and a fulcrum element extending to the other side of said first mentioned part and adapted to support said beam.

8. In a device of the class described, as a sub-combination, a single blank beam support comprising a base portion, a vertical plate portion provided with indicia and a fulcrum carrying part having a portion at each side of said indicia bearing part, each of said three parts being at substantially right angles to the other two.

9. In a device of the class described, as a sub-combination, a single blank beam support comprising a base portion, a vertical plate portion provided with indicia and a fulcrum carrying part having a portion at each side of said indicia bearing part, said three parts being at substantially right angles to each other, said fulcrum carrying part having that portion which is at the opposite side of the indicia bearing part from the fulcrum extending downwardly below said indicia bearing part a distance substantially equal to the thickness of said base part.

10. A weighing device comprising, in combination, an upstanding plate having a scale thereon, a fulcrum projecting transversely from said upstanding plate, a beam comprising a triangular element received at its apex on said fulcrum and supported thereby and fixedly carrying therebelow and at the two sides thereof respectively an article receiving means and a weight, one side of said triangle coacting with said scale in the manner of a pointer.

11. A weighing device comprising, in combination, an upstanding plate having a scale thereon, a fulcrum projecting transversely from said upstanding plate, a beam comprising a triangular element received at its apex on said fulcrum and supported thereby and fixedly carrying therebelow and at the two sides thereof respectively an article receiving means and a weight, one side of said triangle coacting with said scale in the manner of a pointer, a stop for limiting the motion of said beam in one direction and means for adjustably supporting said stop in the path of motion of said beam.

RUSSELL O. BATE.